(12) United States Patent
Monti et al.

(10) Patent No.: US 7,770,780 B2
(45) Date of Patent: Aug. 10, 2010

(54) SYSTEM AND METHOD FOR ASSEMBLING MOTOR-VEHICLE BODY STRUCTURES OR SUB ASSEMBLIES THEREOF

(75) Inventors: Denny Monti, Grugliasco (IT); Bovero Damiano, Grugliasco (IT)

(73) Assignee: Comau S.p.A., Grugliasco (Torino) (IT)

( * ) Notice: Subject to any disclaimer, the term of this patent is extended or adjusted under 35 U.S.C. 154(b) by 273 days.

(21) Appl. No.: 11/853,375

(22) Filed: Sep. 11, 2007

(65) Prior Publication Data

US 2008/0105733 A1    May 8, 2008

(30) Foreign Application Priority Data

Nov. 3, 2006    (EP) .................................. 06425752

(51) Int. Cl.
*B23K 5/22* (2006.01)
(52) U.S. Cl. ...................................................... 228/212
(58) Field of Classification Search .................. 228/212
See application file for complete search history.

(56) References Cited

U.S. PATENT DOCUMENTS

| 5,184,766 A | 2/1993 | Takahashi et al. |
| 2002/0170160 A1 | 11/2002 | Savoy et al. |

FOREIGN PATENT DOCUMENTS

| EP | 95/32886 | 12/1995 |
| FR | 95/12515 | 5/1995 |
| FR | 99/64289 | 12/1999 |
| JP | 2000006861 | 1/2000 |
| JP | 2001151175 | 6/2001 |
| JP | 2003145364 | 5/2003 |
| JP | 2003146265 | 5/2003 |

OTHER PUBLICATIONS

European Search Report dated Apr. 17, 2007.

*Primary Examiner*—Jessica L Ward
*Assistant Examiner*—Nicholas P D'Aniello
(74) *Attorney, Agent, or Firm*—Young Basile

(57) ABSTRACT

Motor-vehicle bodies or sub-assemblies thereof are assembled in a welding-assembly station with the aid of frames arranged at the two sides of the conveying line that traverses the station, said frames being provided with fixtures for locating and clamping the various parts of the body. The side frames are moved between their operative position in the station and an inoperative position at a distance from the station with the aid of multi-axis manipulating robots. Said robots, however, do not carry the frames up to their final operative position for assembling the body, but rather unload them on two rigid structures, which are prearranged at the two sides of the line and are movable in a transverse direction with respect thereto between an open condition and a closed condition. The movable structures, once they have received the frames from the robots in their open condition, displace into their closed condition, thus carrying the frames into their final operative position.

6 Claims, 9 Drawing Sheets

SYSTEM AND METHOD FOR ASSEMBLING MOTOR-VEHICLE BODY STRUCTURES OR SUB ASSEMBLIES THEREOF

BACKGROUND OF THE INVENTION

The present invention relates to systems for assembling motor-vehicle body structures or sub-assemblies thereof of the type comprising:
a welding-assembly station;
a conveying line, for carrying at least part of the structures to be assembled to the assembly station and for carrying the assembled structures out of the assembly station;
a pair of frames equipped with locating and clamping fixtures, which can be positioned in the welding-assembly station, at the two sides of the line, for locating in position and clamping part of the body to be assembled;
welding means, for assembling the structure located in position and clamped in the welding-assembly station; and
one or more manipulating robots, for transferring each of said locating and clamping frames between an operative position in the assembly station and an inoperative position, which is remote with respect to the assembly station.

Systems having the characteristics specified above are, for example, described in the documents Nos. WO-A-9512515 and WO-A-9532886. Said systems are distinguished from other known assembling systems substantially in that the locating and clamping frames used for enabling tack-welding of the body are moved by means of robots and are also for this reason called "robotized framers".

In the robotized framing systems of the type specified above, the motor-vehicle body is tack-welded in the assembly (or "framing") station, by joining the floor panel of the body, which is fed into the assembly station by the conveying line, to the two sides of the body, which are carried by the aforesaid side locating and clamping frames. For instance, the sides can be prepared on the frames when the latter are in their inoperative position, remote with respect to the welding station. The sides are loaded on the frames by the aforesaid manipulating robots that pick them up from conveyors adjacent to the line. The parts of each side are located in position and clamped by means of the locating and clamping fixtures, with which each frame is provided. When a side is ready on the respective supporting frame, the latter is carried into its operative position in the welding station by means of a manipulating robot. For this purpose, the supporting frame is provided with means for coupling to the wrist of the manipulating robot so that in said step the supporting frame functions as gripping tool (or "gripper"), which the manipulating robot uses for handling the respective sides of the body. When the sides reach the operative position in the welding station, they are assembled with the chassis that is positioned therein, by means of further locating and clamping fixtures, which can be carried by the fixed structure of the welding station and/or by the locating and clamping frames. Also positioned in the same framing station are further transverse elements, which connect the two sides of the motor-vehicle at the top in order to impart greater stability on the structure. The structure thus positioned and clamped is subjected to a series of assembly operations, typically welding operations, for example, electrical spot welding and/or laser welding. Typically, the welding fixtures are carried by manipulating robots, which can be at least in part the same robots used for handling the frames, which, once the frames are positioned in their operative position, are released from said frames and equip themselves with welding fixtures for executing the necessary welding operations.

Once welding is completed, the clamping fixtures of the positioning frames are brought into an open condition, disengaged from the welded structure, so that the latter is free to be carried out of the welding station by means of the conveying line.

Systems of this sort are also flexible; i.e., they are also able to operate on different types or models of body, fed along one and the same line. Different models of body imply a different conformation and/or positioning of the locating and clamping fixtures prearranged on the side frames. For this purpose, for each model of body there is provided a corresponding pair of frames with the necessary locating and clamping fixtures. The manipulating robots position in the assembly or framing station the pair of supporting frames corresponding to the type of body that each time is to be assembled in the welding station. For this purpose, pre-arranged adjacent to the welding station are stationary magazines for different types of frames corresponding to different types of body, and, whenever necessary, the manipulating robots put a frame of a type previously used back into a magazine and pick up from another magazine a new type of supporting frame corresponding to a new type of body that must be assembled in the framing station.

A drawback of the systems that have been developed so far lies in the fact that they require pre-arrangement of a structure for locating and clamping of the body to be assembled that is sufficiently rigid to guarantee the necessary quality in obtaining an assembled structure having the pre-set dimensional characteristics. On account of the tolerances of fabrication, it is possible in fact for the body that is formed in the welding station to present, for example, a width greater than the nominal dimension, with the consequence that, when it is located and clamped in the welding station, it exerts a force on the side locating and clamping frames that tends to move the latter away from one another. The precision of the geometry of the welded body is determined, on the one hand, by the fact that the components carried by each frame are located precisely in position with respect to the frame, and on the other by the fact that each frame is located with precision in position when it is in its operative position in the welding station. If said position is not guaranteed precisely, for example, in so far as the structure of the frames is not sufficiently rigid, there follows a lack of dimensional quality of the structures obtained. For this reason, in known systems, the side frames must be produced with a relatively cumbersome and heavy structure and/or are provided with projecting cross members that connect up to one another in the operative position of the two side frames to provide a rigid cage (see, for example, the document No. WO-A-9964289), which involves a further increase in weight, as well as certain additional constraints for the designer, who must avoid the interference between said cross members and the parts of the sides of the body carried by the supporting frames. In other cases (WO-A-9532886), there is envisaged the construction of an entire cage surrounding the body on a number of sides, with the consequence that the side supporting frames must present a structure that is even more cumbersome and heavier. A greater weight and a greater encumbrance of the frames also involves greater difficulties of movement by means of the manipulating robots, which must consequently be sized for the loads to be handled, with an increase in the final cost of the system.

SUMMARY OF THE INVENTION

The purpose of the present invention is to overcome the aforesaid drawbacks. In particular, the purpose of the invention is to provide an assembly or framing system of the type indicated at the beginning of the present description that will guarantee a high dimensional quality of the welded structures and that at the same time will be characterized by the use of locating and clamping frames of relatively small dimensions and relatively low weight, and consequently easier to handle.

The above and other purposes still are achieved by means of the present invention in that, in an assembly system having all the characteristics that have been indicated at the beginning of the present description, it is moreover envisaged that, in the assembly station, at the two sides of the conveying line, two rigid structures will be prearranged, which are movable in a transverse direction with respect to the conveying line between an open position, in which said structures are set at a greater distance from one another, and a closed position, in which said structures are set closer to one another, and it is moreover envisaged that each of said rigid structures is equipped with coupling means for receiving and supporting a respective locating and clamping side frame in the welding station.

In the case of the system according to the invention, when a manipulating robot carries a locating and clamping side frame from its inoperative position to its operative position, it does not deposit it directly in the final position for assembling the body, but rather deposits it on the respective rigid structure, preliminarily prearranged in its open position It is only after the manipulating robot has left the respective side frame on said rigid structure that the side frame is carried into its final operative position by means of a movement of the two rigid structures to their closed condition, where they are close together. In said condition, the sides carried by the two side frames are located and clamped with respect to a floor panel present in the framing station, to enable the welding operations. Each side frame is carried by the respective rigid structure so that the possible stresses to which the frame is subjected as a result of its engagement on the body to be assembled are discharged on the rigid structure. Consequently, the side supporting frame can also have a relatively light structure and not necessarily with high rigidity, since the impossibility of an excessive deformation thereof is guaranteed by its engagement against corresponding contrast surfaces of the rigid structure on which it is received.

As already mentioned, the system according to the invention is suited to being used, like known systems, according to the technique in which the sides of the structure to be welded are prepared on the respective frames when the latter are still in their inoperative position. In the system according to the invention, this can be done both when the supporting frames are in their position remote from the welding station and, according to a possible alternative solution, when the side supporting frames have already been received on the respective rigid structures and the latter are in their open condition, where they are set at a distance from one another. Of course, neither is there ruled out, for the system according to the invention, a use according to a modality, also in itself known, in which the conveying line feeds the welding station with body structures already preliminarily assembled, i.e., already comprising the floor panel and the two sides, in which case the manipulating robots handle "empty" side frames, the fixtures of which for locating and clamping engage the sides of the body when the frames reach their final operative position following upon the movement of closing of the two rigid structures.

According to a further characteristic of a preferred embodiment of the invention, when the two side frames are in their final operative position in the framing station, they can also be used for supporting a front frame and/or a rear frame, arranged transversely with respect to the side frames and carrying further locating and clamping fixtures designed to engage the front part and the rear part of the body to be assembled. In the case of the present invention, however, said auxiliary frames are not required by the need to stiffen the system for locating and clamping the body, given that this stiffness is ensured by the aforesaid transversely movable rigid structures, but rather simply by the possible advantage of prearranging further locating and clamping fixtures in a position suitable for engaging the front and rear parts of the body.

It is to be noted that the pre-arrangement of two transversely movable structures at the two sides of the line for carrying two side frames into position in the welding station for locating and clamping of the body to be welded is known in more traditional systems, where the side frames are not moved by means of robots but rather are movable on rails and controlled by motor means on board the frames or on board carriages for pulling the frames, or else are pre-arranged stationary and designed to control the movement of the frames by means of a mechanical transmission (see, for example, the documents Nos. EP-B-0 642 878 and EP-A-1 611 991 filed in the name of the present applicant). However, the pre-arrangement of transversely movable structures of the type referred to above in a welding system, where the locating and clamping frames are moved by means of robots come up against a technical prejudice since the possibility of handling the frames without any constraint in regard to the path to be followed, which is afforded by robotized framing systems with respect to ones with movable frames on rails, at first sight renders altogether unnecessary the pre-arrangement of the aforesaid transversely movable structures, since the robots are able to bring the frames up to their final operative position for assembly of the body. This is proven by the fact that all the robotized framing systems produced so far exploit precisely robots for carrying the frames into their final operative position. According to the present invention, instead, there is envisaged for the first time the use of robots for handling the side frames for taking said frames not into their final operative position, but rather into the position of accommodation on the two rigid transversely movable structures, and it is then said structures that carry the frames into the final position for assembling the body, with the advantages that have been discussed above.

A further subject of the invention is the method for assembly, which can be implemented using the system described above, according to what is defined in the annexed Claim 11.

BRIEF DESCRIPTION OF THE DRAWINGS

Further characteristics and advantages of the present invention will emerge from the ensuing description with reference to the annexed plate of drawings, which is provided purely by way of non-limiting example and in which.

DETAILED DESCRIPTION

Figure 1:
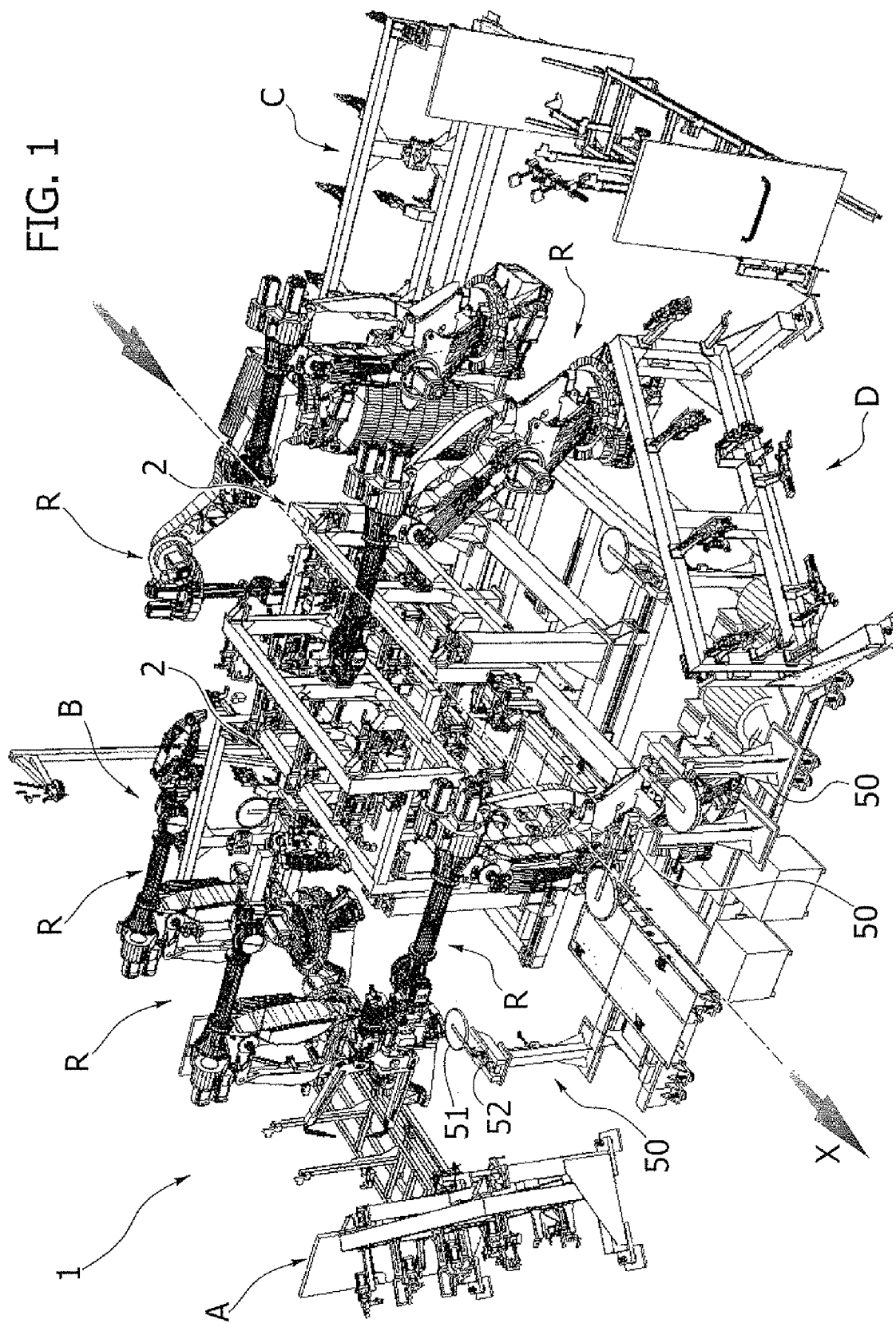
FIG. 1 is a perspective view of a framing station for bodies of motor vehicles, produced in accordance with the teachings of the present invention.

In the drawings, the reference number 1 designates as a whole a station for framing of bodies of motor vehicles constituted by elements made of pressed sheet steel. The framing station 1 is located along a conveying line, indicated schematically with the arrows X in FIG. 1, by means of which the chassis of the bodies to be welded are fed in succession to the framing station 1 and by means of which the welded bodies are carried out of the station. The term "chassis" is herein used to indicate the bottom part of the body of a motor-vehicle, constituted principally by the floor panel and by the structure for supporting the engine set at the front of the floor panel.

The details regarding the structure and operation of the conveying line are not described or illustrated herein in so far as they can be produced in any known way and in so far as they do not fall, taken in themselves, within the scope of the present invention.

According to a technique in itself known, when a chassis reaches and stops in the welding station, it is completed with the addition of the two sides of a motor-vehicle body and possibly with the addition of transverse elements that connect together the top parts of the two sides. Once again according to a technique in itself known, the sides of the body are located in position and clamped in the welding station by means of two side frames 2. Each of said side frames 2 has a metal structure having the conformation that may be clearly seen in FIG. 8 and is provided with a plurality of locating and clamping fixtures 200. Said fixtures are not illustrated in FIG. 8, for convenience of representation, but are clearly visible in FIGS. 1-4 and, at an enlarged scale, in FIG. 9. The locating and clamping fixtures with which the side frames 2 are provided can be produced in any known way. Typically, said fixtures envisage a pair of movable clamping elements that move with respect to one another between an open clamping position and a closed clamping position and have a conformation suited for engaging and locating in position the corresponding parts of sheet steel with which they are to come into contact. It follows that the locating and clamping fixtures depend upon the type of body to be welded. Consequently, if, as in the case of the example illustrated, the welding station is to operate on two different types of motor-vehicle body, it is necessary to envisage two different pairs of side frames 2, equipped with the necessary locating and clamping fixtures, which are interchanged rapidly in the working position in the welding station, to engage the body to be welded, according to the type of body that each time is in the station.

Figure 2:
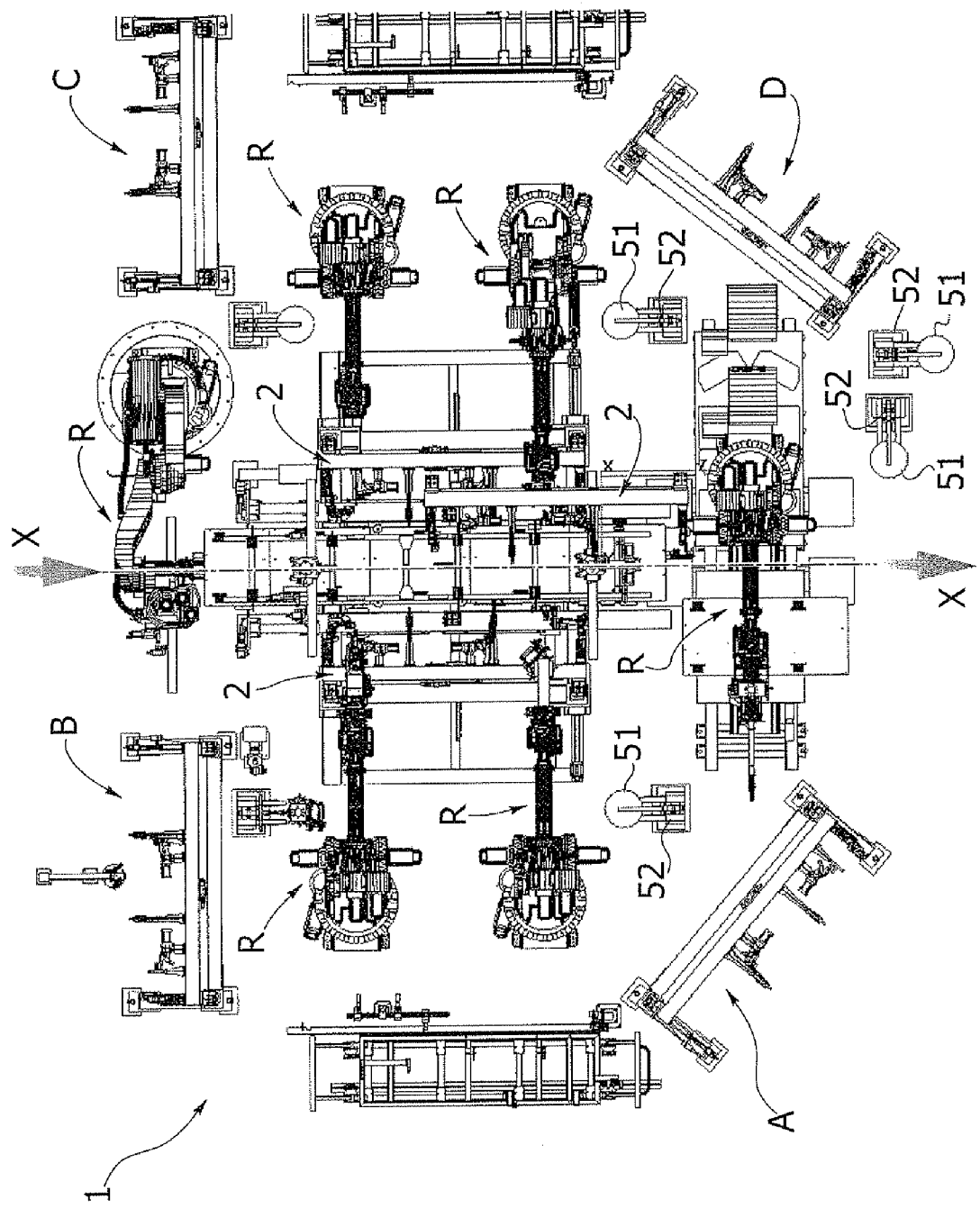
FIG. 2 is a plan view of the framing station of FIG. 1.
Figure 5:
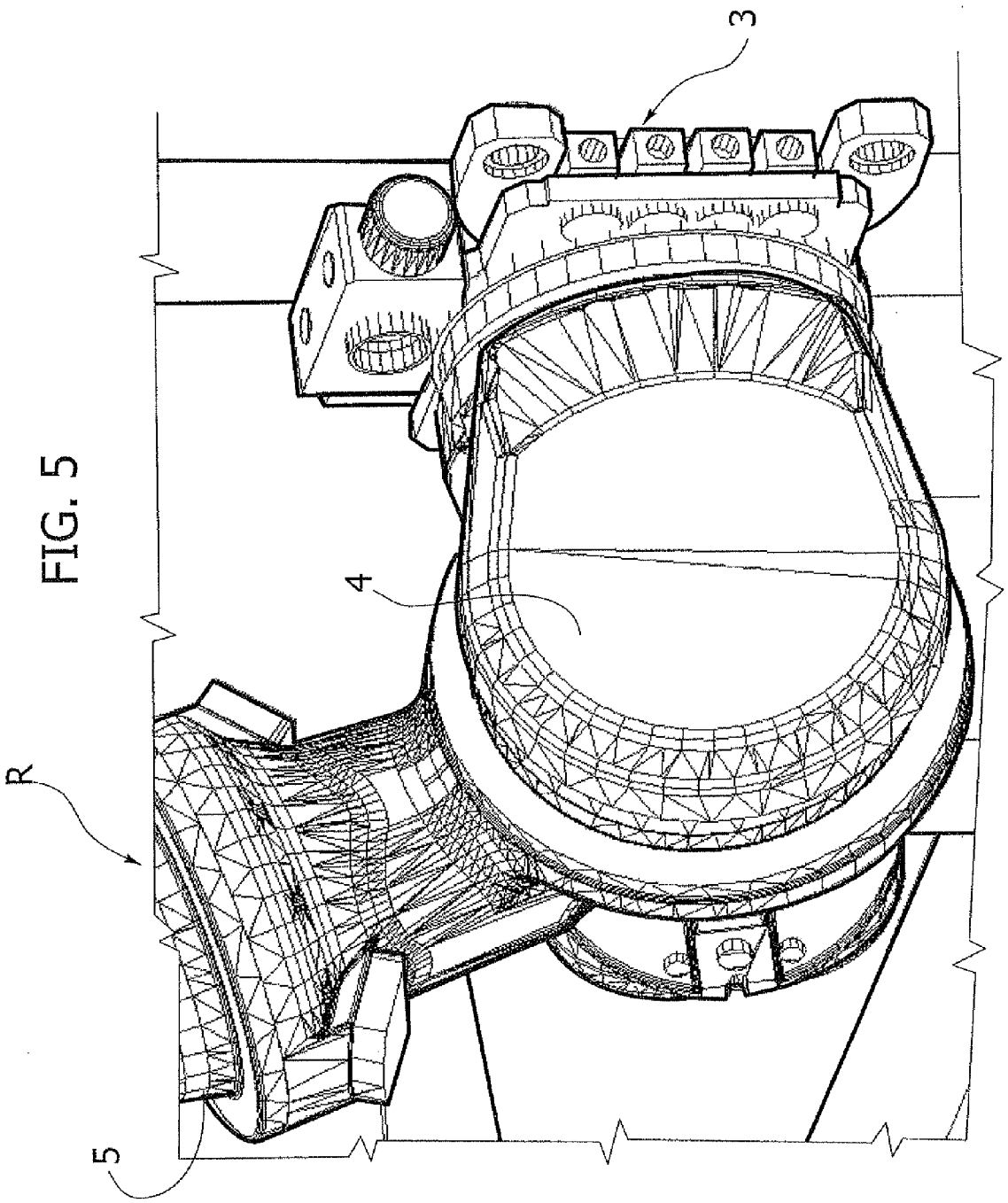
FIGS. 5 and 6 are perspective views, at an enlarged scale, of two details of FIG. 4.

As may be seen in FIGS. 1 and 2, the welding station is prearranged with a plurality of multi-axis manipulating robots R that have both the function of executing electrical spot welding of the body that is each time assembled in the welding station and the function of displacing each side frame 2 between the welding station and a respective storage station, at a distance from the welding station in order to prepare in said storage station the frame with the respective side of body and/or in order to replace the frame that is in the welding station according to the type of body to be welded. For this purpose, each frame 2 is provided with a gripping member 3 (see FIG. 5) with which it can couple, in a way in itself known, a gripping tool 4, with which each robot R is equipped. In the specific example illustrated, each frame 2 has a frame-like structure (see FIG. 8) with a top element 2a and a bottom element 2b connected to one another at the ends by two vertical elements 2b and connected moreover to one another in their intermediate portions by a central column 2c. On the central column 2c, in a vertically median position, is fixed the coupling member 3. Each manipulating robot R is a multi-axis robot in itself of a known type, with a manipulating arm terminating with a wrist 5 that can be coupled in a way in itself known to a tool. Provided in the proximity of the area of the station are one or more tool stations 50, where either gripping tools of the type designated by 4 in FIG. 5 or electrical spot-welding heads are stored. Each storage station 50 is provided with a platform 51 for supporting the tool carried by an oscillating arm 52, which can be actuated by means of an actuator for supporting the tool in a position in which its connectors are protected underneath the platform 51. Each welding robot is programmed to equip itself with the appropriate tool in each operative condition and in particular to equip itself either with a side frame 2 or with a welding head, when it is necessary to weld a body assembled in the welding station and clamped by means of the locating and clamping fixtures carried by the side frames that are in the welding station.

As already mentioned above, in the case of the specific example illustrated, the welding station is provided with two pairs of side frames 2 corresponding to two different types of body to be welded. For this reason, prearranged in the proximity of the welding station are four fixed stations A, B, C and D for depositing the side frames when they are not in the operative position.

Prearranged in each of the stations A, B, C, D is a fixed structure designed to receive and support a side frame 2 that is parked.

Figure 9:
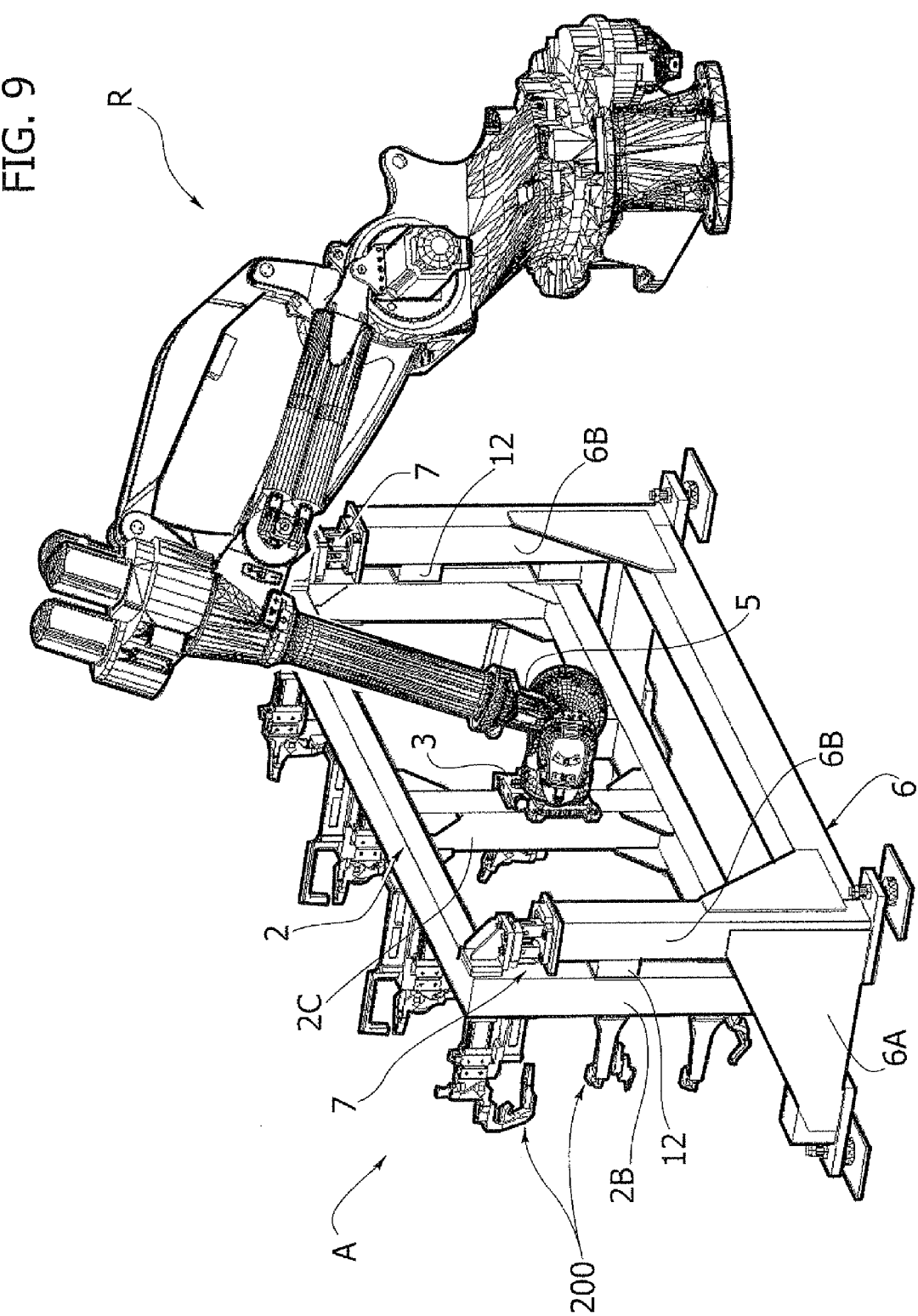
FIG. 9 is a further schematic perspective view of a further detail of the station according to the invention.

FIG. 9 illustrates specifically the fixed structure 6 of the station A. Each fixed structure 6 comprises a base 6A, from which there rise two columns 6B, the top ends of which carry two locating and supporting devices 7 for the side frame 2. As may be seen in FIG. 6, which illustrates the device 7 provided on the top of one of the two columns 6B, pre-arranged on said top are supports 8, on which are mounted so that they can turn four wheels 9 arranged crosswise (only two of which are visible in FIG. 6). The wheels 9 are set in twos facing one another and mounted on shafts two by two parallel to one another, to define between them an empty space designed to receive a vertical pin 90, which projects downwards from a horizontal plate 10 fixed via a bracket 11 to the structure of the frame 2 and projecting therefrom. When a frame 2 is set in the stationary station, it rests with its plates 10 on the wheels 9 at the top of the columns 6B.

Figure 6:
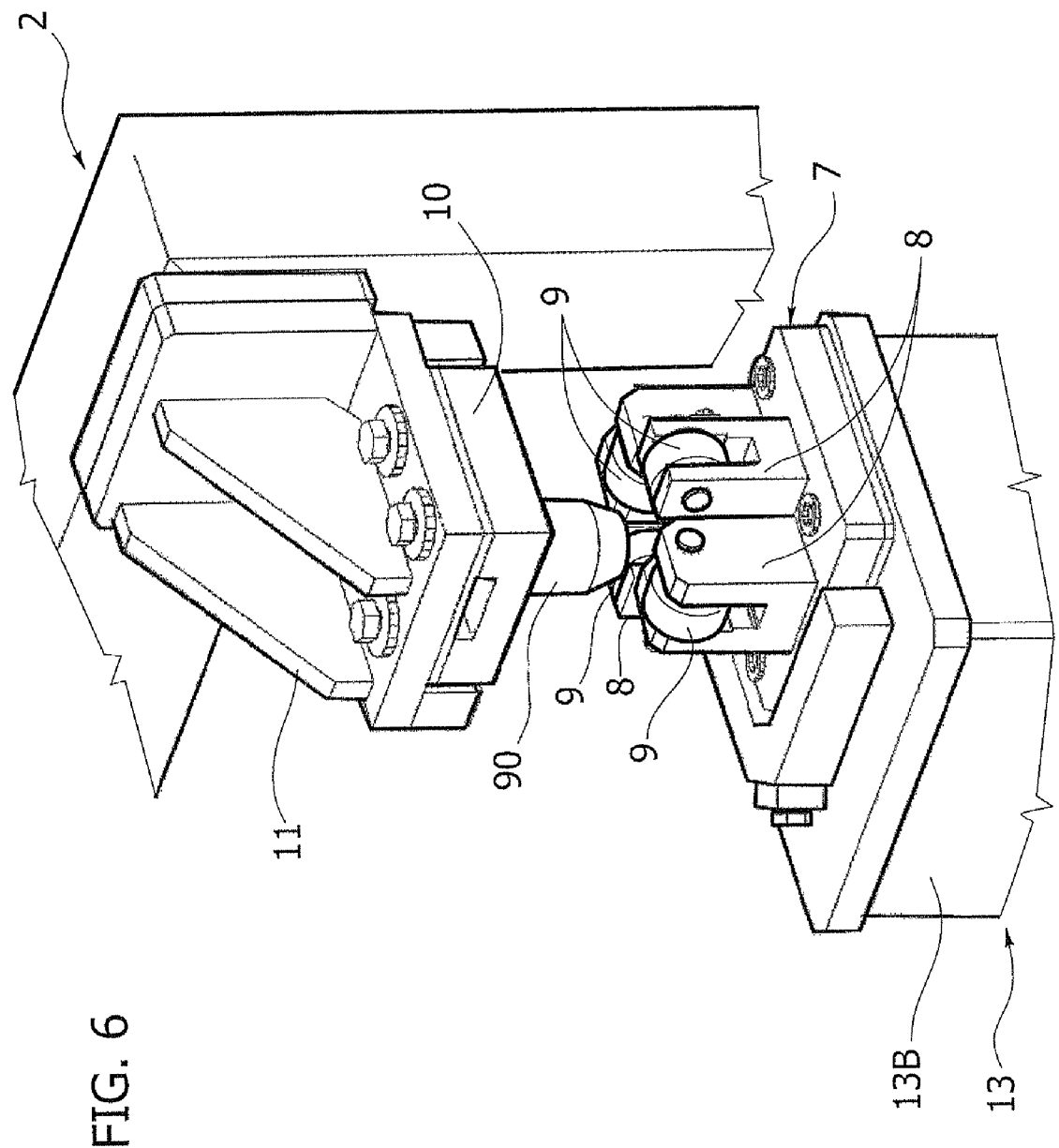

As may be seen in FIG. 6, the coupling space is defined between four wheels 9 mounted so that they are free to turn on the column 6B and arranged crosswise, so that said wheels are set in twos facing one another and mounted on mutually parallel horizontal shafts, the shafts of one pair being orthogonal to the shafts of the other pair and arranged therewith in one and the same horizontal plane, so that the engagement of the pin 90 projecting downwards carried by the frame 2 within the space between the wheels 9 references precisely the position of the frame 2 with respect to the structure 6 in two mutually orthogonal horizontal directions. The bottom horizontal surface of the plate 10, carried by said bracket 11, is designed to rest on said wheels so as to discharge on the structure 6 the weight of the frame 2 and locate precisely the position of the frame 2 with respect to the structure 6 in the vertical direction. If one of the two columns 6B is equipped at the top with the device 7 illustrated in FIG. 6, the other column 6B is equipped at its top with a device 7 identical to the one illustrated in FIG. 6, but with the difference that, in this case, there is provided just one pair of wheels 9 set opposite to one another, and precisely the pair of wheels that have shafts parallel to the plane in which the columns 6B lie. In this way, the device 7 that is provided with four wheels locates in position the frame 2 with respect to two mutually orthogonal horizontal directions, whilst the other device 7 with just two wheels prevents any rotation of the frame 2 with respect to the other column carrying the device 7 with four wheels. Both of the devices 7 then locate the frame vertically thanks to the fact that the plates 10 rest on the wheels of the two devices 7.

In said condition, the frame 2 maintains a vertical configuration, in so far as its end columns 2B rest on supports 12 (FIG. 9) projecting from the columns 6B of the stationary structure 6.

FIG. 9 shows a manipulating multi-axis robot in the step in which it is coupling with the gripping member 3 carried by the frame 2 situated in the fixed station A. Once coupled, the manipulating robot R is able to raise the side frame 2, moving it away from the fixed station A, to set it in the welding station, as will be described in detail in what follows.

Figure 3:
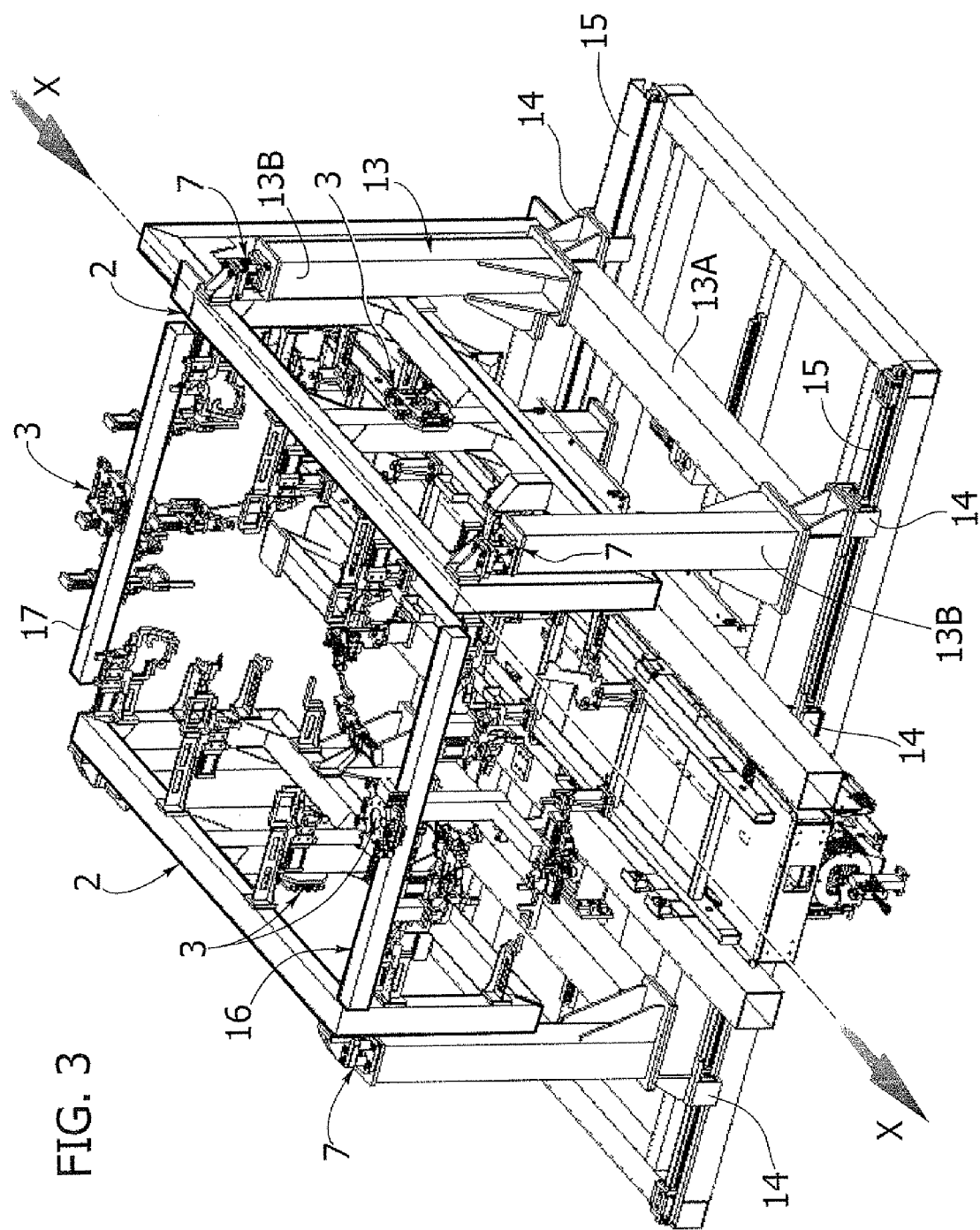
FIG. 3 is a perspective view at an enlarged scale of a detail of the framing station.

Also on the hypothesis that the welding station always operates on one and the same type of body, the manipulating robots in any case handle the corresponding pair of side frames between the operative position in the welding station and the inoperative position in the fixed stations of the same type as the one visible in FIG. 9. In fact, it is in the latter condition that the side frame 2 is prepared with a respective side to be assembled. When the side frame 2 is in the position illustrated in FIG. 9, the locating and clamping fixtures 200 carried thereby are used for association to the frame 2 of a respective vehicle-body side, whether it is constituted by a single element of sheet steel or it is constituted by a number of elements of sheet steel. The composition of the elements of the sides on the side frame 2 that is in a stationary position can be performed in any known way, either manually or by means of automatic devices. Once the preparation of the sides on the side frame 2 that is in a stationary position is completed, a robot R can pick up the frame 2 (as illustrated in FIG. 9) and carry it into the welding station, where the frame 2 is received and supported by a rigid supporting structure 13 substantially similar to each of the stationary structures 6 that have been described above. With reference in particular to FIG. 3, each structure 13 has a base 13A from which there rise two columns 13B terminating at the top with coupling and supporting devices 7 of a type identical to what has already been described above with reference to FIGS. 6, 9. As described above, also in this case the devices 7 ensure the precise locating in position of the frame 2 with respect to the structure 13 both in the direction of the line X and in the horizontal direction orthogonal to the line X, as well as in the vertical direction.

Figure 4:
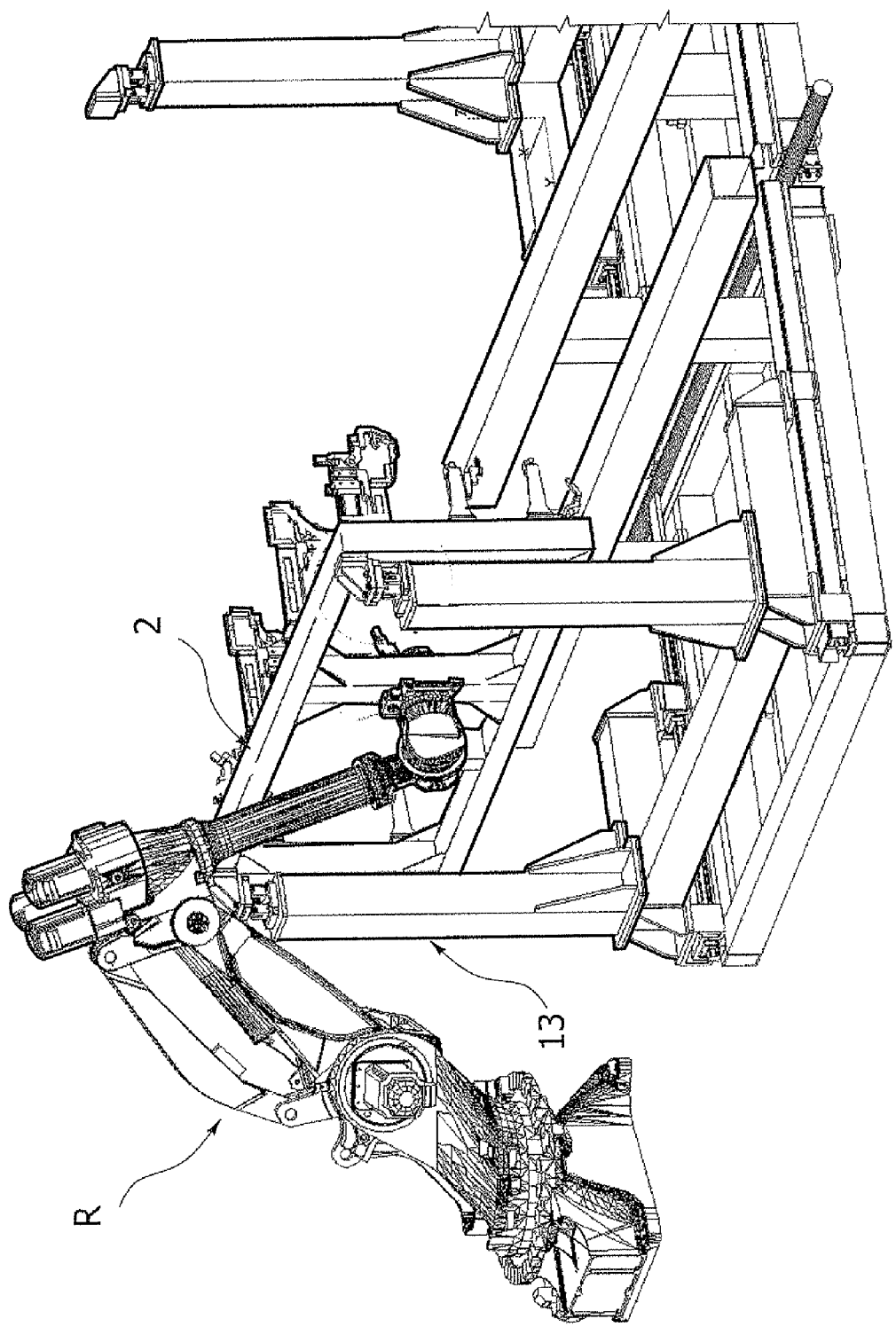
FIG. 4 is a schematic perspective view of a further detail of the station.

FIG. 4 shows the step in which the manipulating robot deposits a side frame 2 on the supporting structure 13. FIG. 1 shows the step in which a robot is ready to position a new frame 2 on the structure 13 and remains waiting with its frame above the structure 13, whilst the robot R set alongside it still has to pick up the frame 2 that is on the structure 13.

As may be clearly seen in FIG. 3, two supporting structures 13 are provided, arranged at the two sides of the line X. The structures 13 are mounted so that they can slide in a direction transverse to the line between an open condition, in which they are set at a greater distance from one another, and a closed condition, in which they are set close up to one another. As may be seen in FIG. 3, each structure 13 is provided, in a position corresponding to its base 13A, with two pairs of sliding blocks 14, mounted so that they can slide on rails 15 fixed to the floor of the station.

The movement of the two structures 13 between their open condition and their closed condition is controlled by means of actuating means of any known type (not illustrated).

The two structures 13 are in their open condition when the manipulating robots R must position on them two side frames 2 carrying two respective sides. Once said operation is terminated, the two structures 13 are brought into their closed condition and set close to one another (FIG. 7), so that the two sides carried by the side frames 2 join up to the chassis, which in the meantime has been carried into the welding station by the conveying line X and are here located in position either by means of locating and clamping fixtures carried by the side frames 2 or possibly by means of locating and clamping fixtures carried by the fixed structure of the station.

When the side frames 2 are in their position set close to one another for assembling the body, the manipulating robots R are moreover used for completing the structure for locating and clamping of the body with a front auxiliary frame 16 and a rear auxiliary frame 17, each comprising a crosswise structure, which is supported at the ends by fixtures for locating and clamping the two side frames 2 and in turn supports further locating and clamping fixtures, designed to engage the front and rear parts of the body to be welded. Once the two auxiliary frames 16, 17 have been positioned, the entire body is located and clamped in position by means of the locating and clamping fixtures carried by the two side frames 2 and by the front or rear frames 16, 17, after which the robots R, which in the meantime have equipped themselves with welding tools, for example, electrical-spot-welding or laser-welding heads, perform a necessary number of welding spots to bestow a stable geometry on the body. Once the welding operation is completed, the locating and clamping fixtures open, and the side frames 2 disengage from the body by movement of the two structures 13 into their open position so as to enable exit of the welded body from the station by means of activation of the conveying line X.

As may be seen in FIG. 3, also the auxiliary frames 16, 17 are provided with coupling members 3 of the same type as the ones with which the side frames are provided, for coupling with the gripping tools of the robots.

Figure 7:
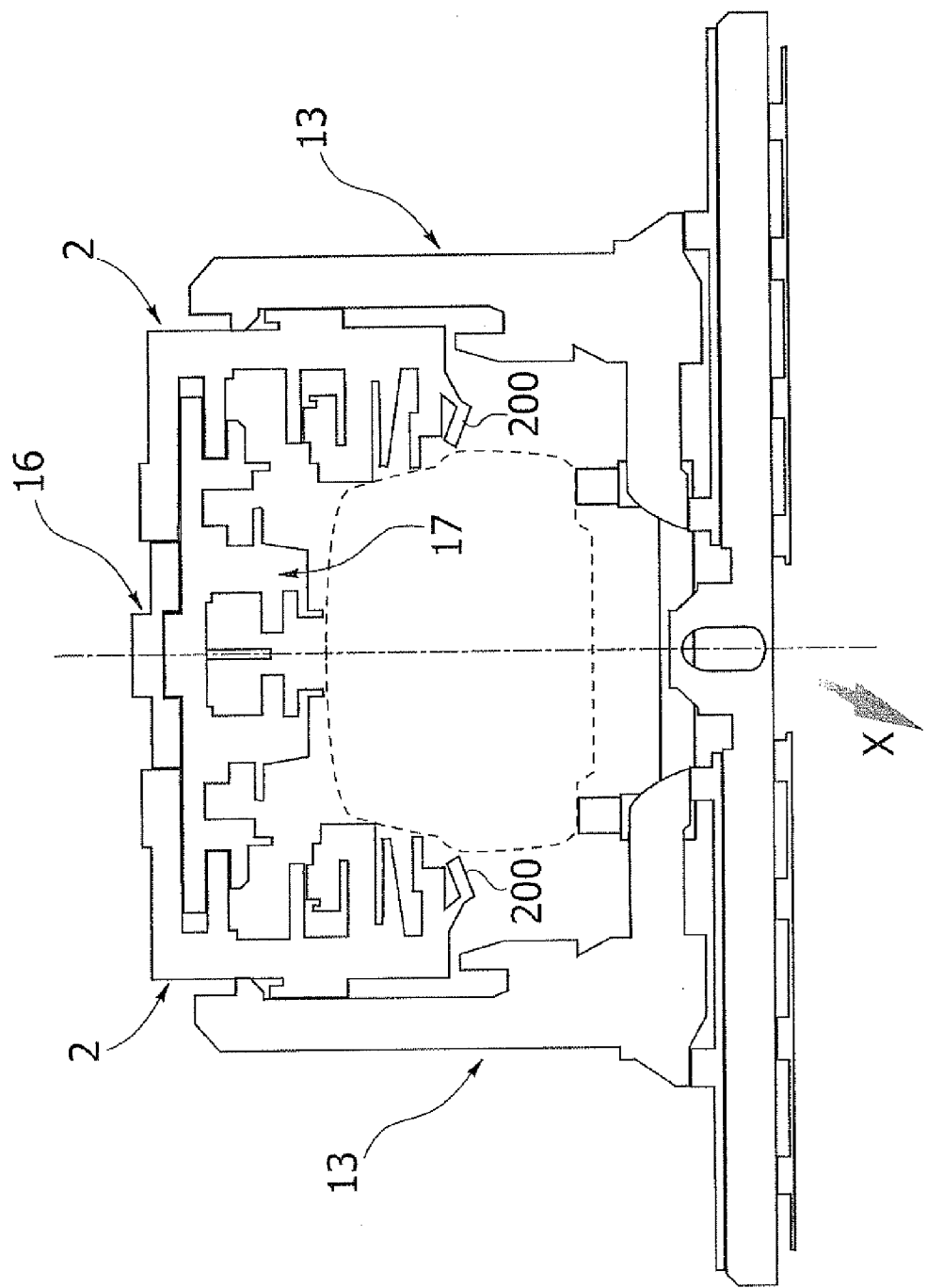
FIG. 7 is a schematic cross-sectional view of the part of the station illustrated in FIG. 3.
Figure 8:
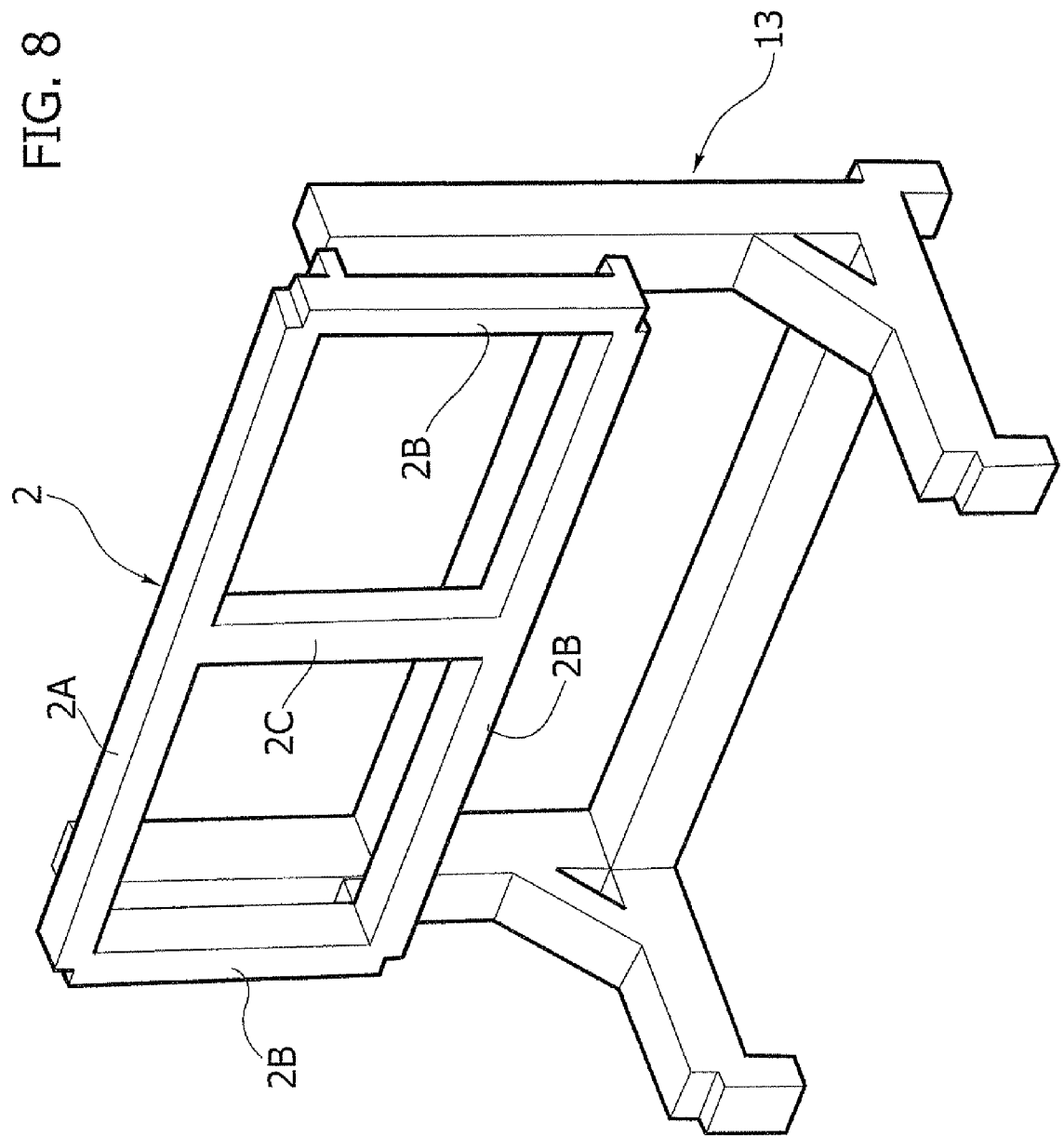
FIG. 8 is a further schematic perspective view of a detail of the station according to the invention.

As may be seen clearly in FIGS. 7 and 8, in the operative condition, when the structures 13 are in a closed position and the side frames 2 and the front and rear frames 16, 17 engage, with their locating and clamping fixtures 200, the structure of the body, any stress to which the side frames 2 are subjected, for example, as a result of a width of the body greater than the nominal one, is discharged on the rigid structures 13 in areas corresponding to those of contact with the frames 2. Thanks to the fact that the structures 13 are adequately designed to have a high stiffness, the side frames 2 can present a relatively light and far from cumbersome structure without this jeopardizing the precision of positioning of the parts to be welded. In fact, it is the structures 13 which, thanks to their sturdiness, guarantee that the locating and clamping fixtures remain in the required position, ensuring the dimensional quality of the welded structure. At the same time, the pre-arrangement of side frames 2 that are relatively light and far from cumbersome considerably facilitates their handling by the robot R.

Consequently, as may be seen, the device according to the present invention presents the advantage of a high quality of production with the use of relatively simple and low-cost means.

Of course, without prejudice to the principle of the invention, the details of construction and the embodiments may vary widely with respect to what is described and illustrated herein purely by way of example, without thereby departing from the scope of the present invention.

What is claimed is:

1. A system for assembling motor-vehicle body structures or sub-assemblies thereof, of the type comprising:
   a welding assembly station;
   a conveying line, for carrying at least part of the structures to be assembled to the assembly station and for carrying the assembled structures out of the assembly station;
   at least one pair of frames equipped with locating and clamping fixtures, which are positioned in the welding station, at the two sides of the line, for locating in position and clamping the body to be assembled;
   a welder for connecting the structure located in position and clamped in the assembly or framing station; and
   one or more manipulating robots, for transferring each of said locating and clamping frames between an operative position in the assembly station and an inoperative position, remote with respect to the assembly station,
   said system being wherein, in the assembly station, at the two sides of the conveying line, are prearranged two rigid structures, which are movable in a transverse direction with respect to the conveying line between an open position, in which said structures are set at a greater distance from one another, and a closed position, in which said structures are set closer to one another; and
   each of said rigid structures further having at least two coupling assemblies connected to the rigid support structure for receiving and supporting a respective locating and clamping side frame on top of the rigid support structure in the welding-assembly station, the at least two coupling assemblies positioned a distance apart along a direction of the conveying line, the coupling assemblies each defining a coupling cavity opening upwards for receiving a pin projecting downwards from a bracket connected to the locating and clamping side frame, said coupling assemblies are pre-arranged for locating in position the respective side frame with respect to the rigid support structure and are adapted to support the weight of the respective side frame and maintain the side frame in a substantially vertical orientation when said pin is installed in said respective coupling assembly, each of said rigid support structures further having at least two lateral supports against which two parallel and overlapping end columns of the respective side frame rest, wherein when a respective side frame is subjected to a transverse force in a direction laterally outward from the conveying line, the respective side frame end columns are pressed against the lateral supports thereby transferring the force away from the respective side frame through the lateral supports and to the rigid support structure.

2. The assembly system according to claim 1, wherein the coupling cavity of at least one of the coupling devices is defined between four wheels, mounted so that they are free to turn on said rigid structure and arranged crosswise, so that said wheels are set in twos facing one another and mounted on mutually parallel horizontal shafts, the shafts of one pair being orthogonal to the shafts of the other pair and arranged therewith in one and the same horizontal plane so that the engagement of the pin projecting downwards carried by the frame within the cavity between the wheels locates precisely the position of the frame with respect to the rigid structure in the direction of the line and in a horizontal direction orthogonal thereto.

3. The assembly system according to claim 2, wherein the coupling pin projects downwards starting from a horizontal surface carried by said bracket that is designed to rest on said wheels, so as to discharge on the rigid structure the weight of the frame and locate precisely the position of the frame with respect to the rigid structure in the vertical direction.

4. The assembly system according to claim 1, wherein each of said rigid transversely movable structures comprises a base that is movable on rails and a pair of rigid columns that rise upwards from the base and that have top ends, which are not connected to one another and carry the coupling means.

5. The assembly system according to claim 1, wherein adjacent to the welding station are provided stationary structures for supporting the side frames that are prearranged each with coupling assemblies for receiving, supporting, and locating in position at least one side frame, said coupling assemblies being identical to the coupling assemblies pre-arranged transversely on said rigid movable structures.

6. The assembly system according to claim 5, wherein each of said stationary structures for supporting the frames in their inoperative position comprises a fixed base and a pair of rigid columns that rise upwards from the base and that have top ends not connected to one another and carrying the coupling assemblies.

* * * * *